(12) United States Patent
Pröjtz

(10) Patent No.: US 6,611,682 B1
(45) Date of Patent: Aug. 26, 2003

(54) MOBILE TELEPHONE APPARATUS AND METHOD FOR CALL DIVERT SERVICE

(75) Inventor: Fredrik Pröjtz, Malmö (SE)

(73) Assignee: Telefonaktiebolaget LM Ericsson(Publ), Stockholm (SE)

( * ) Notice: Subject to any disclaimer, the term of this patent is extended or adjusted under 35 U.S.C. 154(b) by 0 days.

(21) Appl. No.: 09/387,088

(22) Filed: Aug. 31, 1999

(30) Foreign Application Priority Data

Sep. 1, 1998 (SE) .............................................. 9802932

(51) Int. Cl.[7] .................................................. H04Q 7/20
(52) U.S. Cl. ...................................... 455/417; 455/445
(58) Field of Search ................................. 455/414, 417, 455/422, 434, 445, 459, 512, 517, 519; 379/88.22, 88.23, 261, 210, 211, 212, 260

(56) References Cited

U.S. PATENT DOCUMENTS

| | | | |
|---|---|---|---|
| 5,029,196 A | | 7/1991 | Morganstein ................. 379/67 |
| 5,222,123 A | * | 6/1993 | Brown et al. ................ 455/417 |
| 5,274,698 A | * | 12/1993 | Jang ........................... 379/198 |
| 5,473,671 A | * | 12/1995 | Partridge, III .............. 455/445 |
| 5,553,125 A | | 9/1996 | Martensson ................. 379/140 |
| 5,592,541 A | * | 1/1997 | Fleischer, III et al. ...... 379/211 |
| 5,596,627 A | * | 1/1997 | Solomon et al. ............. 379/67 |
| 5,752,191 A | * | 5/1998 | Fuller et al. ................ 455/445 |
| 5,802,157 A | | 9/1998 | Clarke et al. ............... 379/196 |
| 5,845,219 A | | 12/1998 | Henriksson ................. 455/567 |
| 6,049,601 A | * | 4/2000 | Orui ........................... 379/211 |
| 6,049,719 A | * | 4/2000 | Schroter ..................... 455/462 |
| 6,085,080 A | * | 7/2000 | Rahikainen et al. ........ 455/403 |
| 6,091,948 A | * | 7/2000 | Carr et al. .................. 455/414 |
| 6,115,613 A | * | 9/2000 | Jonsson ...................... 455/519 |
| 6,134,311 A | * | 10/2000 | Ekstrom ..................... 379/201 |
| 6,188,888 B1 | * | 2/2001 | Bartle et al. ................ 455/417 |
| 6,198,812 B1 | * | 3/2001 | Weber ........................ 379/142 |
| 6,208,872 B1 | * | 3/2001 | Schmidt ..................... 455/518 |
| 6,253,075 B1 | * | 6/2001 | Beghtol et al. ............. 455/415 |
| 6,256,503 B1 | * | 7/2001 | Stephens .................... 455/456 |
| 6,377,794 B2 | * | 4/2002 | Takahashi ................... 455/415 |
| 6,466,786 B1 | * | 10/2002 | Wallenius .................. 455/433 |

FOREIGN PATENT DOCUMENTS

| | | |
|---|---|---|
| EP | 0810765 A2 | 12/1997 |
| GB | 2280084 A | 1/1995 |
| GB | 2 324 224 A | 10/1998 |

OTHER PUBLICATIONS

Raivio, J.; PCT International Search Report, International App. No. PCT/SE99/01381; Feb. 1, 2000, pp. 1–4.
Raivio, J., International–Type Search Report; Jun. 16, 1999; Search Request No. SE98/00917; pp. 1–3.

* cited by examiner

Primary Examiner—Nay Maung
Assistant Examiner—Jean A Gelin
(74) Attorney, Agent, or Firm—Jenkens & Gilchrist, P.C.

(57) ABSTRACT

A telephone apparatus (1) in a mobile telephone system providing a conditional call divert service causing an incoming call to proceed as a normal call or be redirected to a different number. The telephone apparatus has memory means (16) for storing coded telephone number entries. Each telephone number entry includes a group identification field for storing a value identifying its telephone number group, and the telephone apparatus further has control circuit means (15) enabling optional operation modes of the telephone. One mode causes an incoming call from a telephone having a subscriber number which is a member of a telephone number group associated with the mode to proceed as a normal call, and an incoming call from another telephone having a subscriber number which is not a member of the group to be redirected to a preset number.

10 Claims, 4 Drawing Sheets

MOBILE TELEPHONE APPARATUS AND METHOD FOR CALL DIVERT SERVICE

FIELD OF THE INVENTION

The present invention relates to a telephone apparatus and a method for call divert in a mobile telephone system and more particularly to a telephone apparatus and a method for conditional call divert in a mobile telephone system.

DESCRIPTION OF THE PRIOR ART

Modern telephone systems or telecommunication networks consist of three general categories of equipment: terminal equipment, transmission equipment and switching equipment. Each of these three categories, in turn, comprises a number of subcategories or technologies. For example, termination equipment includes telephone sets, wiring, and other components, as well as recording, answering, and voice mail equipment. Further, both public and private networks are available.

Different kinds of services for the subscribers are provided in telephone systems. These services are applicable to public switched telephone networks as well as mobile telephone networks, such as GSM systems.

Call divert is a service enabling the subscriber to redirect calls to another destination, for example his voice mail or home telephone.

EP-A-494 525 discloses a telephone apparatus providing a Calling Line Identification or CLI related function, wherein CLI implies that the subscriber number of the telephone from which a call is originated is transmitted in binary code to a receiving subscriber telephone. The telephone comprises a memory in which telephone numbers can be stored together with an associated operating instruction. For example, an instruction causes a "BUSY LINE" as a response to a calling subscriber although the called subscriber is not busy in a call but does not want to answer the phone. Thus, the telephone can respond with a "BUSY LINE" signal for calls originating from selected telephone numbers.

Another instruction may cause the call to be redirected to a different number, e.g. to a specified number selected from the telephone number store.

Hence, the telephone may respond in one particular way for one telephone number and in a different way for a second telephone number while operation may proceed as normal for calls from other telephone numbers.

Also, U.S. Pat. No. 5,329,578 discloses a system providing a CLI-function, wherein telephone calls are diverted to other numbers or may pass as regular phone calls depending on different conditions. Calls to a personal number assigned to the subscriber are routed to a PCS (personal communication services) node which will re-route the call according to the subscriber's service profile stored in a database. For example, a user of the phone may store different settings in order to accept normal calls, or only calls associated with a particular priority, or emergency calls. The identification of the calling subscriber is performed by means of CLI or a password system. However, this system is more complicated than the system disclosed by EP-A-494 525.

A conventional call divert provided in a mobile telephone system may divert all calls regardless of whether the mobile phone is turned on or off, or if the user does not answer within a preset time period, is busy, or if the phone is out of reach of a network.

However, if the same mobile phone is used both at work, at home and in other environments or situations, and the subscriber does for example not want to answer calls associated with his work if he is at home, none of these services are suitable.

SUMMARY OF THE INVENTION

The present invention is directed to a mobile telephone apparatus providing an improved conditional call divert service and a method for the same, wherein an incoming call to the present mobile phone having a particular phone number is accepted or diverted to another phone number depending on the current operation mode of the phone. This is accomplished with a telephone apparatus according to the invention, comprising means enabling the mobile phone to operate in at least two different modes. In a first mode the phone accepts calls from subscribers having a first set of phone numbers and diverts other phone calls to another phone number, and when it is in a second mode the phone accepts calls from subscribers having a second set of phone numbers and diverts other phone calls to still another phone number.

Thus, by identifying the telephone number of the calling subscriber, and depending on the number, the call is accepted or diverted to another phone number or a voice mail.

Another object of the invention is to provide a telephone apparatus having a conditional call divert service, wherein in the first mode telephone calls associated with the subscriber's work are accepted and other phone calls are diverted to another number, and in the second mode private telephone calls are accepted and work related phone calls are diverted to another phone number.

Still another object of the invention is to provide a telephone apparatus having a conditional call divert service, wherein phone calls not accepted may be divided into groups of phone numbers, members of each group being diverted to different numbers.

An advantage of the present invention appears when the same mobile phone is used by a subscriber both at work, at home and in other environments or situations, and the subscriber does for example not want to answer calls associated with his work if he is at home and vice versa. According to the invention the subscriber can control who can reach him or not in a suitable way.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

The present invention relates to a mobile telephone apparatus providing a conditional call divert service and a method for accomplishing the same, wherein an incoming call to the present mobile phone having a particular phone number is accepted or diverted to another phone number depending on the current operation mode of the phone. This is accomplished with a telephone apparatus according to the invention as shown in FIGS. 1 and 2.

In the following description, numerous specific details, such as key names, function names etc., are provided in detail in order to give a more thorough description of the present invention. It will be obvious for those skilled in the art that the present invention may be practiced without these specific details. Some well-known features are not described in detail so as not to make the present invention unclear.

Figure 1:
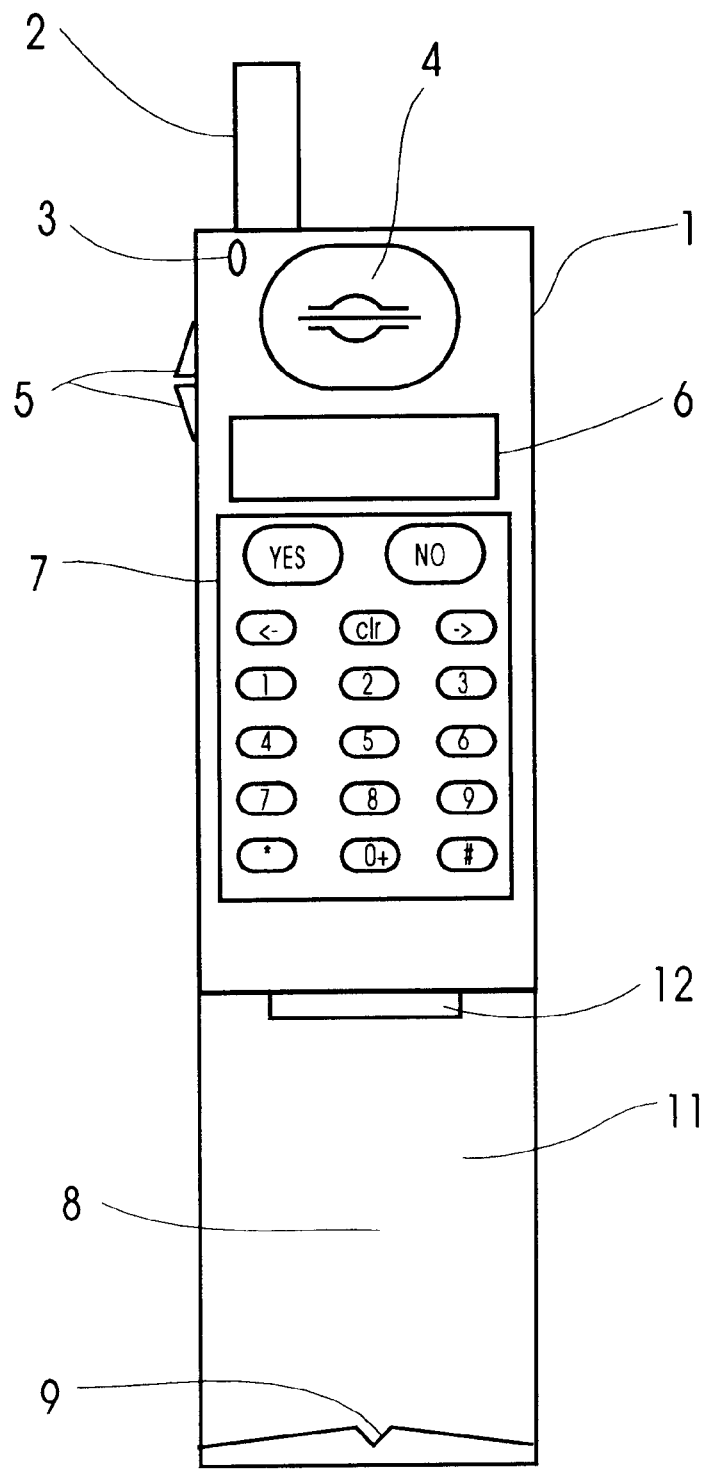
FIG. 1 is a schematical front view of a mobile phone provided with means for conditional call divert service according to the invention.
Figure 2:
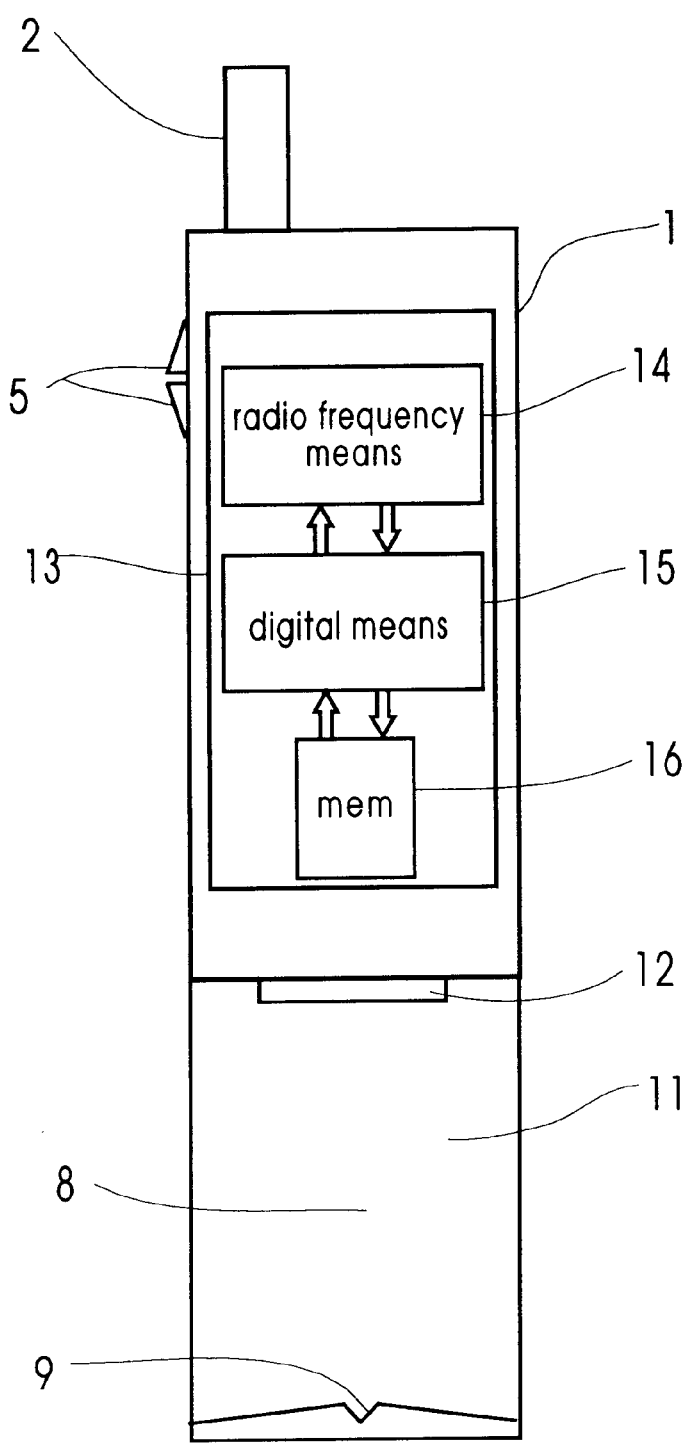
FIG. 2 is a schematical view of the internal circuit blocks of the mobile phone in FIG. 1.

With reference to FIG. 1, a conventional mobile telephone apparatus or mobile phone 1 is shown, having an antenna 2, a status light 3, an earpiece 4, volume keys 5, a display 6, a keypad 7, an inside microphone 8 and a microphone channel 9, a battery 10, and a flip 11, pivotably arranged on said housing 1 by means of attachment means 12. However, different functional entities are distinguished from each other in different phones. Similar to state of the art mobile phones these entities are provided physically on one printed circuit board (PCB) 13 as shown in FIG. 2.

Further, the mobile phone comprises radio frequency means 14 for the receiving, transmission, and modulation tasks, and control circuit means or digital means 15, which take care of the data processing, control, and signaling functions in association with memory means 16. All these means are provided on the single PCB 13 as shown in FIG. 2.

The mobile phone according to the present invention comprises means, both hardware and software entities, integrated in the digital means 15 and memory means 16 on the PCB 13, enabling the mobile phone to operate in the different modes.

The telephone apparatus 1 according to the invention provides a conditional call divert service causing an incoming call to proceed as a normal call or be redirected to a different number. The memory means 16 is used for storing coded telephone number entries, wherein each telephone number entry includes a group identification field for storing a value identifying its telephone number group, and the digital means 15 or other control circuit means enabling optional operation modes of the phone. One mode causes an incoming call from a telephone having a subscriber number which is a member of a telephone number group associated with the mode to proceed as a normal call, and an incoming call from another telephone having a subscriber number which is not a member of the group to be redirected to a preset number.

A private mode and a work mode is available in one embodiment of the invention.

In the private mode all of the incoming calls which is identified as work related phone numbers are diverted to a preset number, for example a switchboard of the company or a voice mail machine. On the other hand, when the phone is operating in work mode all of the incoming calls which is identified as private related phone numbers are diverted to another preset number, for example a private voice mail machine.

Figure 3:
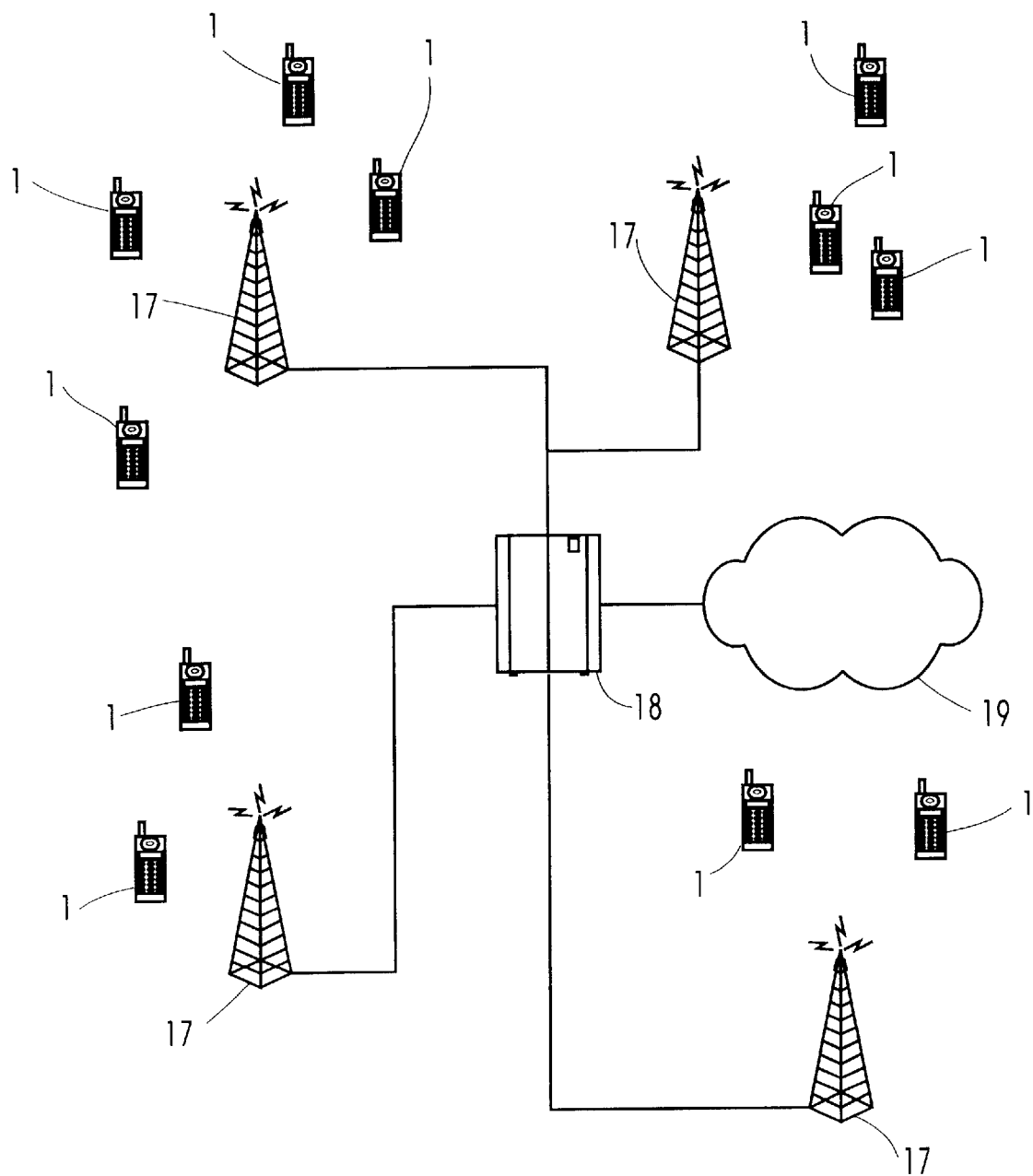
FIG. 3 is a schematical view of a mobile radio system according to the invention.

FIG. 3 is a schematical view of an example of a cellular network. It is a technique that involves subdivision of a service area into a number of small cells. With reference to FIG. 3, the mobile telephone interface to the cellular network is a base station 17, usually located in the center of a cell. In order to establish or maintain a call between two subscribers in a cellular network, the mobile telephone has to be in contact with the base station 17. As each cell has a limited area, the mobile telephone 1 has to be in contact with different base stations 17 if it is moved out from one cell area to another.

An MSC (mobile service switching center) 18 is the interface of the cellular network to the PSTN (public switched telephone network) 19. Depending on the configuration and size of the network one or several MSCs 18 are required.

Of course, a cellular network such as GSM (global system for mobile communications) comprises additional equipments in order to operate in a proper way. However, this is well known by the skilled man and will not be described in further detail herein.

In the following description the mobile telecommunication network or telephone system is used as an example of a network and is not intended to be a limitation of the concept. Consequently, the network can be provided with other cellular network configurations, or a satellite network, etc.

The telephone system and the switching equipment in particular provides for different kinds of services. In order to support the new service according to the invention the system has to support for conventional telephone services such as establishing regular phone calls and disconnecting them etc.

Further, the system according to the invention comprises means for detecting a telephone number of a call subscriber terminal, means for checking if the current number is entitled to pass, which means are included in the mobile phone, and means for playing a voice message included in the network.

Phone numbers and subscriber names can be stored and recalled from an electronic phone book. A phone number is stored by entering the phone number on the keypad. Then the arrow key(s) is pressed until the Store menu is shown, and in order to confirm the storing the YES key is pressed.

In order to store a name of a subscriber of the already entered phone number the first letter of the name is entered by pressing the appropriate numeric key as many times as required to obtain the desired letter or symbol, for example three times on key 2 to get a letter C. The next letter of the name is entered when the cursor has moved to the next position and so on until the name is done. The name is confirmed and stored in a selected memory position by pressing the YES key.

In this embodiment each entry in the phonebook has an extra flag (a bit) showing whether it is a work-related number, the bit being set, or a private-related number, the bit not being set. However, phone numbers not represented in the phonebook are optionally handled as private- or work-related numbers.

In one embodiment of the invention the operation mode, private or work, is set by pressing the arrow key(s) until the operation mode menu is shown. For activation of the menu the YES key is pressed and the desired mode, private or work in the embodiment, is selected by pressing an arrow key until the desired mode appears, and, finally, in order to actually switch to the new mode the YES key is pressed.

As described above, in the private mode all of the incoming calls which are identified as work related phone numbers are diverted to a preset number, for example a switchboard of the company or a voice mail machine. In the other way, when the phone is operating in work mode all of the incoming calls which are identified as private related phone numbers are diverted to another preset number, for example a private voice mail machine.

Further, the phone numbers and names in the phone book can be changed through an EditPhBook menu in the embodiment. The EditPhBook menu is selected, whereupon either the full name or the first letter of the desired name is entered and is confirmed by pressing the YES key. The first name that matches the letter string is displayed. Another way to find the name is to scroll to the wanted name. The name is scrolled to change it letter by letter and the changed name is confirmed and stored by pressing the YES key. Then the phone number is changed in a similar way. If the number is a work-related number the extra flag (a bit) is set, or if the number is a private-related number the extra flag (a bit) is not set.

Figure 4:
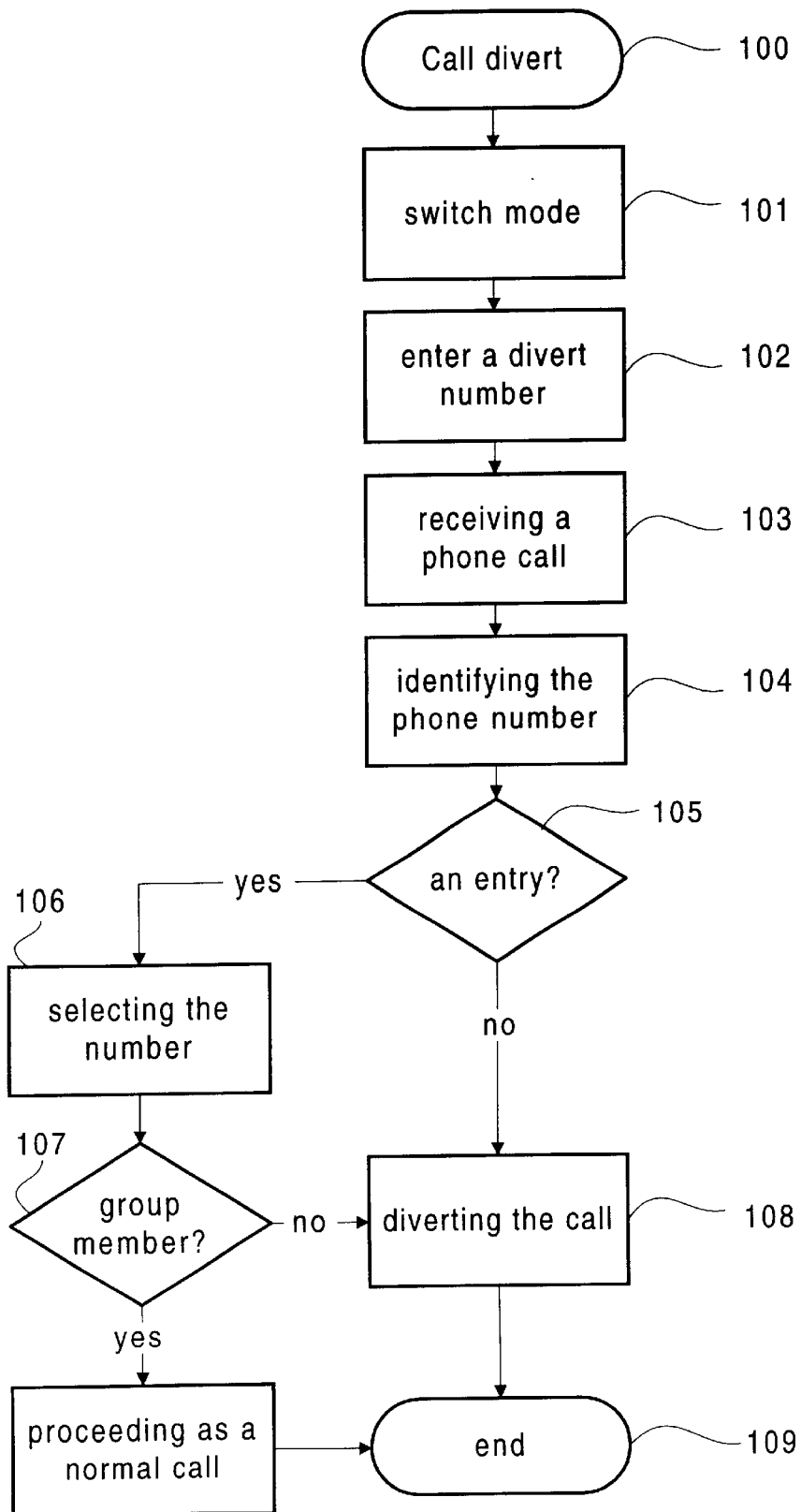
FIG. 4 is a flow chart of a first embodiment of a conditional call divert method according to the present invention.

In a method according to the present invention a subscriber A is for example at home and does not want to answer calls from work-related numbers. Thus, as illustrated by the flow chart in FIG. 4 starting at step 100, the mobile phone is switched to the private mode at step 101 by pressing the arrow key(s) until the operation mode menu is shown. For activation of the menu the YES key is pressed and the desired mode, private, is selected by pressing an arrow key until the desired mode appears, and in order to switch to the new mode the YES key is pressed. Further, the phone number to which incoming calls not related to the selected mode should be diverted, for example a switchboard of a company, is entered and stored at step 102. This number can be preset or changed at any time.

Another subscriber B makes a phone call from a regular telephone or a mobile phone, not necessarily provided with the call divert function according to the invention, which call is received by the subscriber A, at step 103, having a mobile phone according to the present invention. The subscriber B has a telephone number, which is an entry in the phone book of the subscriber A having the flag set, i.e a work-related number in the embodiment.

The received call at the subscriber A is detected and the telephone number of the calling subscriber B is identified at step 104. If the current number is an entry in the phone book of A or not is checked at step 105. Since the telephone number of B is an entry in the phone book it is further selected at step 106. By evaluating the value in the group identification field, identifying the telephone number group, in the selected entry, at step 107 it is determined that the received number is not a member of the group associated with the current mode, the private mode. Thus, the incoming call is diverted to the preset number at step 108 and the method ends up at step 109.

Still another subscriber C makes a phone call from a regular telephone or a mobile phone to the subscriber A at step 103. The subscriber C has a telephone number, which is an entry in the phone book of the subscriber A having the flag not set, i.e a private-related number in the embodiment.

The incoming call at the subscriber A is detected and the telephone number of the calling subscriber C is identified at step 104. If the current number is an entry in the phone book of A or not is checked at step 105. Since the telephone number of C is an entry in the phone book it is further selected at step 106. By evaluating the value in the group identification field, identifying the telephone number group, in the selected entry, at step 107 it is determined that the received number is a member of the group associated with the current mode, the private mode. Thus, the incoming call can proceed as a normal call at step 110. For example the subscriber A retrieves the call by pressing the off hook key (YES key), and a connection is established between A and C. When the conversation comes to an end both subscribers A and C hang up and the connection is disconnected; the method is completed.

In another case the subscriber A is at work and wants to answer calls from work-related numbers but does not want to answer calls from private-related numbers. Thus, he switches his mobile phone to the work mode by pressing the arrow key(s) until the operation mode menu is shown. For activation of the menu the YES key is pressed and the desired mode, work, is selected by pressing an arrow key until the desired mode appears, and in order to switch to the new mode the YES key is pressed. Further, the phone number to which incoming calls not related to the selected mode should be diverted, for example a private voice mail, is entered and stored.

The other subscriber B makes a phone call from a regular telephone or a mobile phone to the subscriber A having a mobile phone according to the present invention. The subscriber B has a work related telephone number, having the flag set in the group identification field.

The received call at the subscriber A is detected and the telephone number of the calling subscriber B is identified at step 104. If the current number is an entry in the phone book of A or not is checked at step 105. Since the telephone number of B is an entry in the phone book it is further selected at step 106. By evaluating the value in the group identification field, identifying the telephone number group, in the selected entry, at step 107 it is determined that the received number is a member of the group associated with the current mode, the work mode. Thus, the incoming call can proceed as a normal call at step 110.

The subscriber C makes a phone call to the subscriber A at step 103. The subscriber C has a private-related number in the embodiment.

The incoming call at the subscriber A is detected and the telephone number of the calling subscriber C is identified at step 104. If the current number is an entry in the phone book of A or not is checked at step 105. Since the telephone number of C is an entry in the phone book it is further selected at step 106. By evaluating the value in the group identification field, identifying the telephone number group, in the selected entry, at step 107 it is determined that the received number is not a member of the group associated with the current mode, the private mode. Thus, the incoming call is diverted to the preset number at step 108 and the method ends up at step 109.

Further, if a calling subscriber D has a number not being an entry in the phonebook of A it is immediately diverted to the preset number after it is identified at the steps 104 and 105.

It should be apparent that the present invention provides a mobile telephone apparatus providing an improved conditional call divert service and a method for the same, that fully satisfies the aims and advantages set forth above. Although the invention has been described in conjunction with specific embodiments thereof, this invention is susceptible of embodiments in different forms, with the understanding that the present disclosure is to be considered as an exemplification of the principles of the invention and is not intended to limit the invention to the specific embodiments illustrated.

In the embodiment described above the present invention provides a conditional call divert service and a method of the same, wherein an incoming call to the present mobile phone having a particular phone number is accepted or diverted to another phone number depending on the current operation mode, work or private, of the phone. Thus, the phone numbers are divided in two sets or groups. However, in other embodiments of the invention the phone numbers can be divided in other groups, for example the family, relatives, friends, colleagues, customers etc. Incoming calls from a particular group of phone numbers can either pass or be diverted to a predetermined phone number depending on the setting. Additionally, each group of numbers can be associated with a particular number to which they are diverted when the phone operates in a specific mode. For example, if the phone operates in the work mode incoming calls from family-related numbers are diverted to a first number and friend-related numbers to a second number, but colleagues and customers may pass. Further, if the phone operates in private mode calls from the family and friends may pass, but colleagues are diverted to a third number and customers a fourth number.

Accordingly, the invention is intended to embrace all such alternatives, modifications and variations that fall within the scope of the appended claims.

What is claimed is:

1. A telephone apparatus in a mobile telephone system providing a conditional call divert service causing an incoming call to proceed as a normal call or be redirected to a different number, comprising:

memory means for storing coded telephone number entries, each coded telephone number entry including a group identification field for storing a value identifying its telephone number group, and control circuit means enabling optional operation modes of the telephone apparatus, wherein a first mode causes an incoming call from a calling telephone having a subscriber number which is a member of a first telephone number group associated with the first mode to proceed as a normal call, and causes another incoming call from another calling telephone having a subscriber number which is not a member of the first telephone number group to be redirected.

2. The telephone apparatus according to claim 1, and further including a second telephone number group that includes telephone number entries not stored in the memory means of the telephone apparatus.

3. The telephone apparatus according to claim 1, wherein said first mode causes said another incoming call to be redirected to one of a voice mail or a preset number.

4. The telephone apparatus according to claim 3, wherein a subscriber number of a third telephone number group are redirected to one of another voice mail or another preset number.

5. The telephone apparatus according to claim 1, wherein a second mode of the telephone apparatus causes an incoming call from a telephone having a subscriber number which is a member of said first telephone number group to be redirected.

6. A method for conditional call diverting in a receiving telephone apparatus, comprising:

switching the receiving telephone apparatus to a desired operating mode;

receiving an incoming telephone call from a calling telephone apparatus;

identifying the telephone number of the calling telephone apparatus;

checking if the telephone number of the calling telephone apparatus is an entry in a phone book of the receiving telephone apparatus; and if the telephone number of the calling telephone apparatus is an entry in the phone book detecting if the telephone number of the calling telephone apparatus is a member of a first telephone number group associated with the desired operating mode and processing the incoming call as a normal call if the telephone number is a member of the first telephone number group, and diverting the incoming call if the telephone number is not a member of the first telephone number group.

7. The method according to claim 6, wherein a second telephone number group includes telephone number entries not stored in said phone book of the apparatus.

8. The method according to claim 6, wherein another incoming call is redirected to one of a voice mail or a preset number.

9. The method according to claim 8, wherein a subscriber number of a third telephone number group are redirected to one of another voice mail or another preset number.

10. The method according to claim 6, wherein another operating mode of the receiving telephone apparatus causes an incoming call from a telephone number having a subscriber number which is a member of said first telephone number group to be redirected.

* * * * *